(12) United States Patent
Koest

(10) Patent No.: US 7,453,558 B2
(45) Date of Patent: Nov. 18, 2008

(54) MEASURING DEVICE FOR MEASURING THE REFRACTION PROPERTIES OF OPTICAL LENSES

(75) Inventor: Gert Koest, Hannover (DE)

(73) Assignee: Oculus Optikgeraete GmbH, Wetzlar Dutenhofen (DE)

( * ) Notice: Subject to any disclaimer, the term of this patent is extended or adjusted under 35 U.S.C. 154(b) by 156 days.

(21) Appl. No.: 11/388,483

(22) Filed: Mar. 23, 2006

(65) Prior Publication Data

US 2006/0238747 A1 Oct. 26, 2006

(30) Foreign Application Priority Data

Mar. 23, 2005 (DE) .................. 20 2005 004 934 U

(51) Int. Cl.
*G01N 21/41* (2006.01)

(52) U.S. Cl. ..................................... 356/128
(58) Field of Classification Search ................. 356/124, 356/128
See application file for complete search history.

(56) References Cited

U.S. PATENT DOCUMENTS

| 5,307,141 A | * | 4/1994 | Fujieda | ........................ 356/124 |
| 5,523,836 A | * | 6/1996 | Minix | ........................ 356/124 |
| 6,195,164 B1 | * | 2/2001 | Thompson et al. | .......... 356/604 |

FOREIGN PATENT DOCUMENTS

| EP | 1 136 806 A2 | 9/2001 |
| EP | 1 248 093 A1 | 10/2002 |

OTHER PUBLICATIONS

European Patent Office Search Report for Counterpart EPO Patent Application No. EP 006000540-1236, 6 pgs. (Oct. 25, 2007).

* cited by examiner

*Primary Examiner*—Tarifur R. Chowdhury
*Assistant Examiner*—Isiaka O Akanbi
(74) *Attorney, Agent, or Firm*—Blakely, Sokoloff, Taylor & Zafman LLP

(57) ABSTRACT

The invention relates to a measuring device (01) for measuring the refraction properties of optical lenses (07), especially spectacle glasses, comprising a measuring light grid (20) for producing a plurality of light beams (16) which are deflected by the lens (07) as a result of refraction of light, and comprising a measuring light detector (12) on which the deflected light beams are projected and are there recorded electronically, and comprising an evaluation device in which the refraction properties of the lens (07) are determined from the measurement signals of the measuring light detector (12), wherein an additional measuring system (14, 20) for electronic measurement of the geometry of the front lens surface (18) and/or the rear lens surface (19) is provided in the device, wherein the measurement result of the additional measuring system (14) is included in the determination of the refraction properties of the lens (07) in the evaluation device.

24 Claims, 5 Drawing Sheets

MEASURING DEVICE FOR MEASURING THE REFRACTION PROPERTIES OF OPTICAL LENSES

FIELD

The invention relates to a measuring device for measuring the refraction properties of optical lenses, especially spectacle glasses according to the preamble of claim 1.

BACKGROUND

Such a device, also known under the term vertex refractometer, is known from the prior art. Generically, a measuring light grid for producing a plurality of light beams is provided in these vertex refractometers. This measuring light grid can be formed, for example, by four light-emitting diodes. The light beams produced by the measuring light grid are deflected by the lens to be studied as a result of refraction of light, the light beams being projected onto a measuring light detector and recorded there electronically. The measuring light grid is projected in a characteristic fashion on the measuring light detector depending on the refraction properties of the lens so that the refraction properties of the lens can be determined from the measurement signals of the measuring light detector. In the generic measuring devices this determination of the refraction properties is made in an evaluation device in which, for example, the illumination pattern recorded using the measuring light detector is evaluated by suitable image processing.

A disadvantage with the known vertex refractometers is that the refraction properties of the lens can always only be studied at one point. For this purpose, for example, the part of the lens to be studied must be placed in the measuring device such that it is located on the principal measurement axis of the measuring device. The refraction properties of the lens can then be determined in this special area. In the case of a regular cylindrical lens, it is sufficient to determine the refraction properties at one point since the refraction properties do not vary over the different areas of the lens.

However, the measurement of irregular lenses, for example, progressive lenses is problematical since in these irregular lenses the refraction properties vary depending on the different areas of the lens. So far, when making measurements of these irregular lenses, it has been necessary for the operator to move the lens by hand between the individual measuring processes in the measuring device and in this way successive measured values are determined for the different areas of the lens. This type of measurement is extraordinarily laborious, inaccurate and cost-intensive.

SUMMARY

Starting from the prior art, it is thus the object of the present invention to provide a new measuring device for measuring the refraction properties of optical lenses.

This object is solved by a measuring device according to the teaching of claim 1.

Advantageous embodiments of the invention are the subject matter of the dependent claims.

The measuring device according to the invention is based on the basic idea of providing an additional measuring system for the electronic measurement of the geometry of the front lens surface and/or the rear lens surface in the measuring device. This means, in other words, that the topography of the lens to be studied can be determined using the additional measuring system of the measuring device according to the invention. As a result, the additional measuring system provides the geometrical data of the lens surface as the measurement result, this geometrical data being taken into account in the determination of the refraction properties of the lens in the evaluation device. As a result, by inserting suitable measuring light grids, the refraction properties of the lens can be determined in all areas without the lens needing to be moved for this purpose in the measuring device. The defined arrangement of a measurement point of the lens in the measuring device is replaced by determining the topography of the entire lens by using the additional lens system and taking this into account when determining the refraction properties in the various areas of the lens.

If the lenses to be studied are arranged in a defined position in the measuring device, this defined relative position between lens and measuring device can be taken into account as a predefined boundary condition of the measurements. In many cases, however, the defined arrangement of the lens in the measuring device is difficult or impossible so that measurement errors arise from the positional deviations resulting therefrom. It is thus particularly advantageous if the relative position of the lens in the measuring device can also be determined using the additional measuring system. This additional measurement result is then also used when determining the refraction properties of the lens in the evaluation device.

The way in which the additional measuring system is constructed in order to determine the geometry and the topography of the lens and/or the relative position between lens and measuring device is fundamentally arbitrary. According to a preferred embodiment, a reflection light measuring system is used to measure the lens geometry or the lens position. This reflection light measuring system comprises at least one reflection measuring light source and a reflection measuring light detector. The light beam produced by the reflection measuring light source is at least partly reflected at the front lens surface and/or at the rear lens surface, the reflected fraction of the light beam being projected onto the reflection measuring light detector and there recorded electronically. The measured signals recorded by the reflection measuring light detector are evaluated in the evaluation and device and the lens surface or the position of the lens in the measuring device is determined therefrom.

In addition to determining the lens topography or the lens position, the degree of antireflection coating of the lens surface can also be determined from the measurement signals of the reflection measuring light detector in order to make predictions on the coating of the lens.

Furthermore, by evaluating the various measurement signals of the reflection measuring light detector or the measuring light detector, it is then possible to determine the refractive index n of the material from which the lens is made.

Furthermore, it is particularly advantageous if at least two light sources of the measuring light grid or at least two reflection measuring light sources produce light beams having different light color. This different light color makes it possible to determine the spectral transmittivity of the material from which the lens being studied is made, as a material characteristic from the measurement signals of the reflection measuring light detector or the measurement signals of the measuring light detector.

In principle, various light sources can be used for the measuring light grid and the reflection measuring light. However, the measuring device according to the invention can be produced particularly inexpensively if the light sources of the measuring light grid at the same time serve as reflection measuring light sources of the additional measuring system. In this way, additional reflection measuring light sources can be dispensed with so that the additional measurement system can be achieved merely by incorporating an additional reflection measuring light detector.

The point at which the reflection measuring light detector is built into the device is fundamentally arbitrary. According to a preferred embodiment, the reflection measuring light detector is disposed at the center of the measuring light grid.

Furthermore, it is particularly advantageous if the reflection measuring light detector is disposed opposite to the measuring light detector on the principal optic axis of the measuring device so that an overall axisymmetric measuring system with respect to the principal axis of the measuring device is obtained.

The type of light sources used to form the measuring light grid or the reflection measuring light grid is fundamentally arbitrary. For example, lamps can be used for this purpose in combination with suitably constructed slit or point diaphragms. The measuring device can be implemented particularly inexpensively and simply if point light sources, especially light-emitting diodes are used to produce the measuring light or reflection measuring light. The light-emitting diodes should preferably emit white light.

The evaluation of the measurement signals of the reflection measuring light detector or the measuring light detector is simplified considerably if the reflection measuring light sources or the light sources of the measuring light grid are arranged in accordance with a Cartesian or polar grid. It is especially preferred if 64 light sources are arranged in a polar grid of 16 lines and 4 concentric circles.

The reflection measuring light detector and/or measuring light detector is preferably constructed in the fashion of a video sensor, In particular, CCD chips or CMOS chips can be used for this purpose.

In order to enhance the evaluation accuracy of the measurement result of the measuring light detector, it is particularly advantageous if a screen having a plurality of light passage openings is arranged between the lens to be studied and the measuring light detector. These light passage openings in the screen have the effect that the various light beams deflected by refraction of light in the lens are in turn multiply projected along separate ray paths onto the measuring light detector. This has the result that during operation of a single light source of the measuring light grid, a plurality of light points are projected onto the measuring light detector according to the number of light passage openings, where each individual light point can be evaluated with regard to the refraction properties in the evaluation device.

The light passage openings in the screen should preferably have a circular cross-section since the circular light projections on the measuring light detector produced thereby can be evaluated particularly accurately and simply.

Moreover, the evaluation of the light pattern on the measuring light detector is considerably simplified if the light passage openings of the screen are arranged according to a Cartesian or polar grid. A Cartesian 6×6 grid of 36 light passage openings in total has proved to be particularly suitable.

Furthermore, one light passage opening of the screen should have a different cross-section, especially a larger cross-section than the other light passage openings, in order to serve in this way as index marking in the illumination pattern during image analysis of the measurement signals of the measuring light detector.

The way in which the light passage openings are constructed in the screen is fundamentally arbitrary. According to a preferred embodiment, a nontransparent screen is used, where the light passage openings are formed by recesses in the nontransparent screen. These recesses can be produced very accurately, for example, by drilling using a laser beam.

Alternatively thereto, a transparent screen can also be used, where the light passage openings are formed by recesses in a nontransparent coating on the transparent screen. For example, a suitable printed image can be applied very simply and inexpensively to a transparent screen, for example of glass.

A multipoint bearing comprising preferably three bearing points should be provided for mounting the lens in the measuring device. The distance between the bearing points of the multipoint bearing should preferably be adjustable so that lenses of different size can be optimally mounted in the measuring device.

The way in which the evaluation results of the evaluation unit are displayed is fundamentally arbitrary. Preferably, a display unit, for example a screen or a printer, should be connected to the evaluation unit. The evaluation results, especially the geometry of the front or rear lens surface or the refraction properties of the lens can then be displayed graphically in two-dimensional form on the display unit.

BRIEF DESCRIPTION OF THE DRAWINGS

One embodiment of the invention is shown schematically in the drawings and is explained as an example hereinafter.

In the figures.

DETAILED DESCRIPTION

Figure 1:
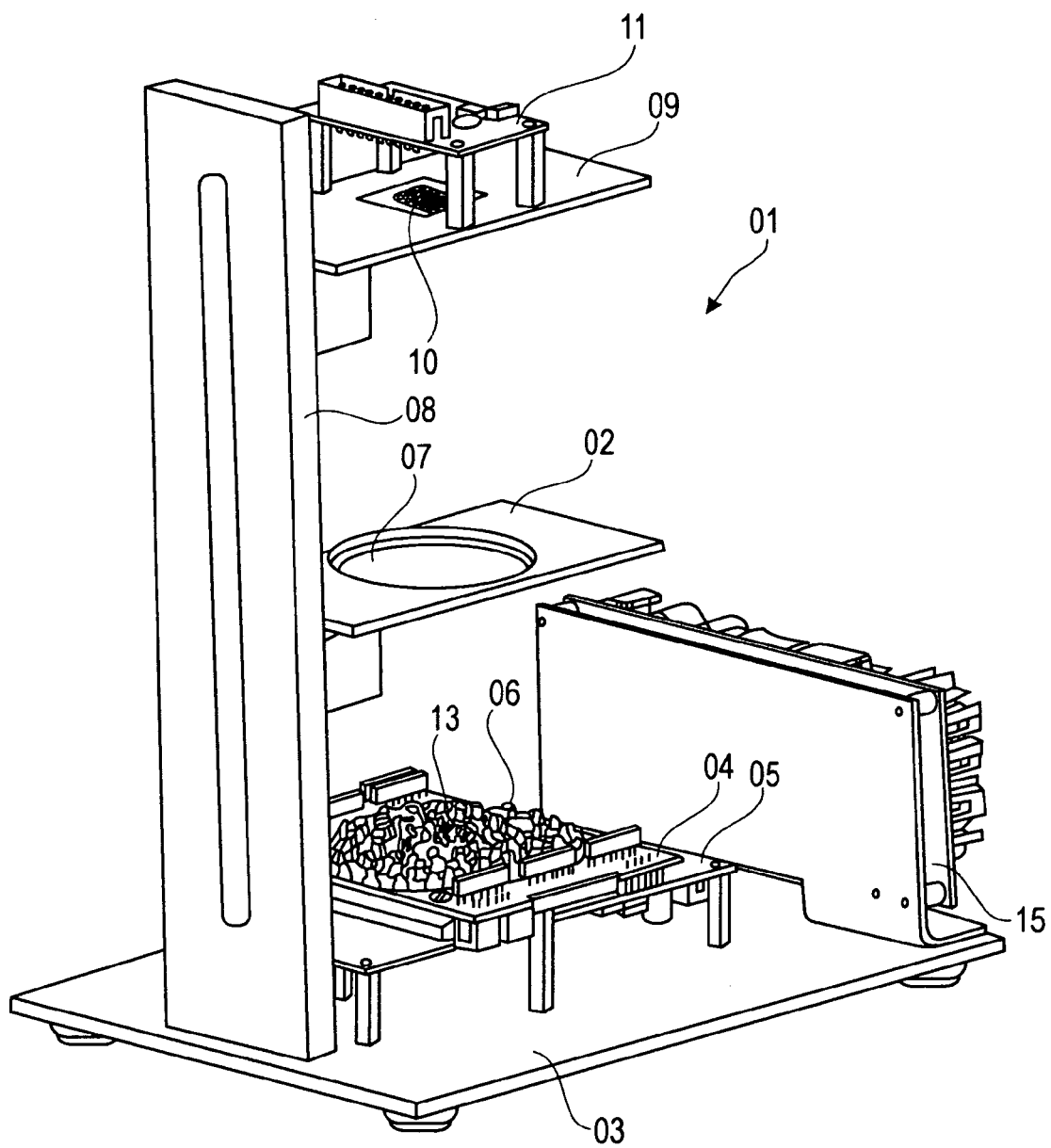
FIG. 1 is a perspective view of a measuring device for measuring the refraction properties of optical lenses.

FIG. 1 shows a measuring device 01 for measuring the refraction properties of optical lens in perspective view. A support 02 having a suitably large through opening is provided for mounting a lens 07 in the measuring device 01. The lens 07 is placed on this support 02 from above during the measurement.

Two electronics plates 04 and 05 are fixed to a base plate 03 using fixing bolts. The electronics plate 04 carries a plurality of light-emitting diodes 06 which emit white light and are arranged according to a polar grid at the points of intersection of 16 lines with 4 concentric circles. The structure of the grid for the arrangement of the light-emitting diodes 06 can be seen from FIG. 4.

Furthermore, the electronics plate 04 carries the electronic control components for controlling the light-emitting diodes 06. The light-emitting diodes 06 form a measuring light grid which can be used to determine the refraction properties of the lens 07. At the same time, the light-emitting diodes 06 also serve as reflection measuring light sources which can be used to determine the geometry of the lens 07 to be studied and its relative position in the measuring device 01.

In addition, a mounting plate 09 is fixed to a stand 08 which holds the support 02, so that its height can be adjusted. Located in a recess of the mounting plate 09 is a screen 10 which comprises 36 light passage openings 23 arranged in a grid and an index light passage opening 24. Above the screen 10 another electronics plate 11 is affixed on the mounting plate 09, on the lower side of which directed towards the screen 12 there is located a measuring light detector 12 which for example is constructed in the fashion of a CMOS chip or CCD chip. Located on the electronics plate 05 underneath a recess 13 in the electronics plate 04 is a reflection measuring light detector 14 at which light reflected at the lens 07 can be recorded.

Figure 2:
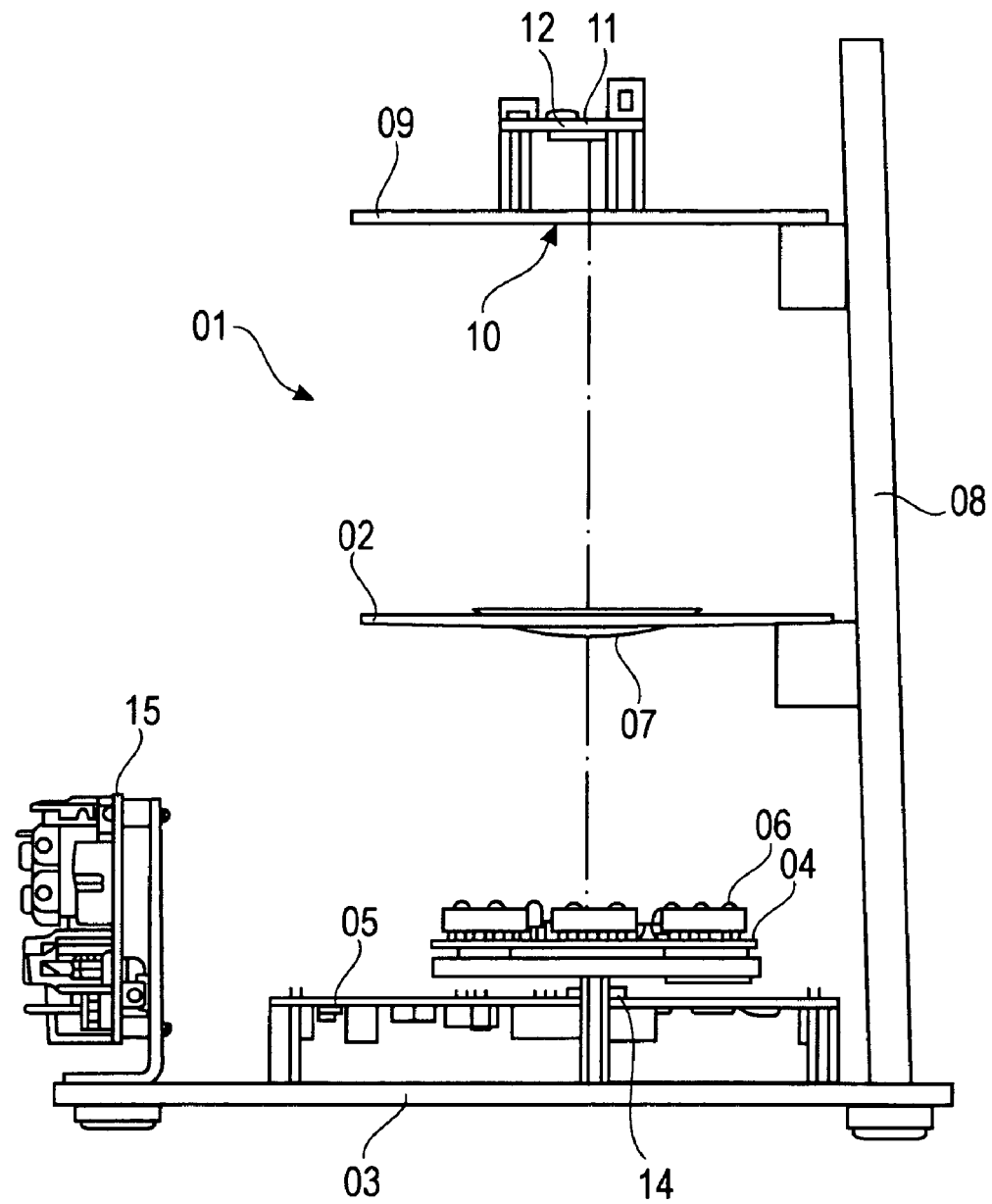
FIG. 2 is a side view of the measuring device from FIG. 1.

The electronics plates 04, 05 and 11 are connected by means of cables not shown in FIG. 1 and FIG. 2 to a further electronics plate 15 which is equipped with the microelectronics serving as the evaluation device and the power electronics required to operate the measuring device 01.

The measuring principle of the measuring device 01 will be explained in further detail hereinafter with reference to the schematic diagram in FIG. 3. For determining the refraction properties of the lens 07 this is first place on the support 02. Instead of the rigid support 02 shown in FIG. 1, a three-point support can also be used where the distance of bearing points from one another is adjustable. When carrying out the measurement on the lens 07, the light-emitting diodes 06 are switched on successively, each individually, and deliver a white-colored light beam 16. This light beam 16 is deflected by refraction as a result of the optical properties of the lens and at the back of the lens 07, is emitted in the direction of the measuring light detector 12 at a certain refraction angle which represents the refraction properties of the lens 07 at the corresponding point.

Since the screen 10 comprising a grid of 37 light passage openings is located before the measuring light detector 12, the light beam 16 deflected by refraction is projected along 37 different ray paths onto the measuring light detector 12 and there forms a light point grid characteristic of the refraction properties of the lens 07 at the light passage point. This means, in other words, that the light beam 16 emitted on switching on a light-emitting diode 06, after passing through the lens 07 and the screen 10, forms a light point grid of 37 light points on the measuring light detector 12. This light point grid is recorded electronically by the measuring light detector 12 and in the evaluation electronics is compared with the light point grid obtained when the corresponding light-emitting diode 06 is operated without interposing a lens 07. The refraction properties of the lens 07 at the corresponding point can then be determined from the difference between the two light point grids.

Figure 3:
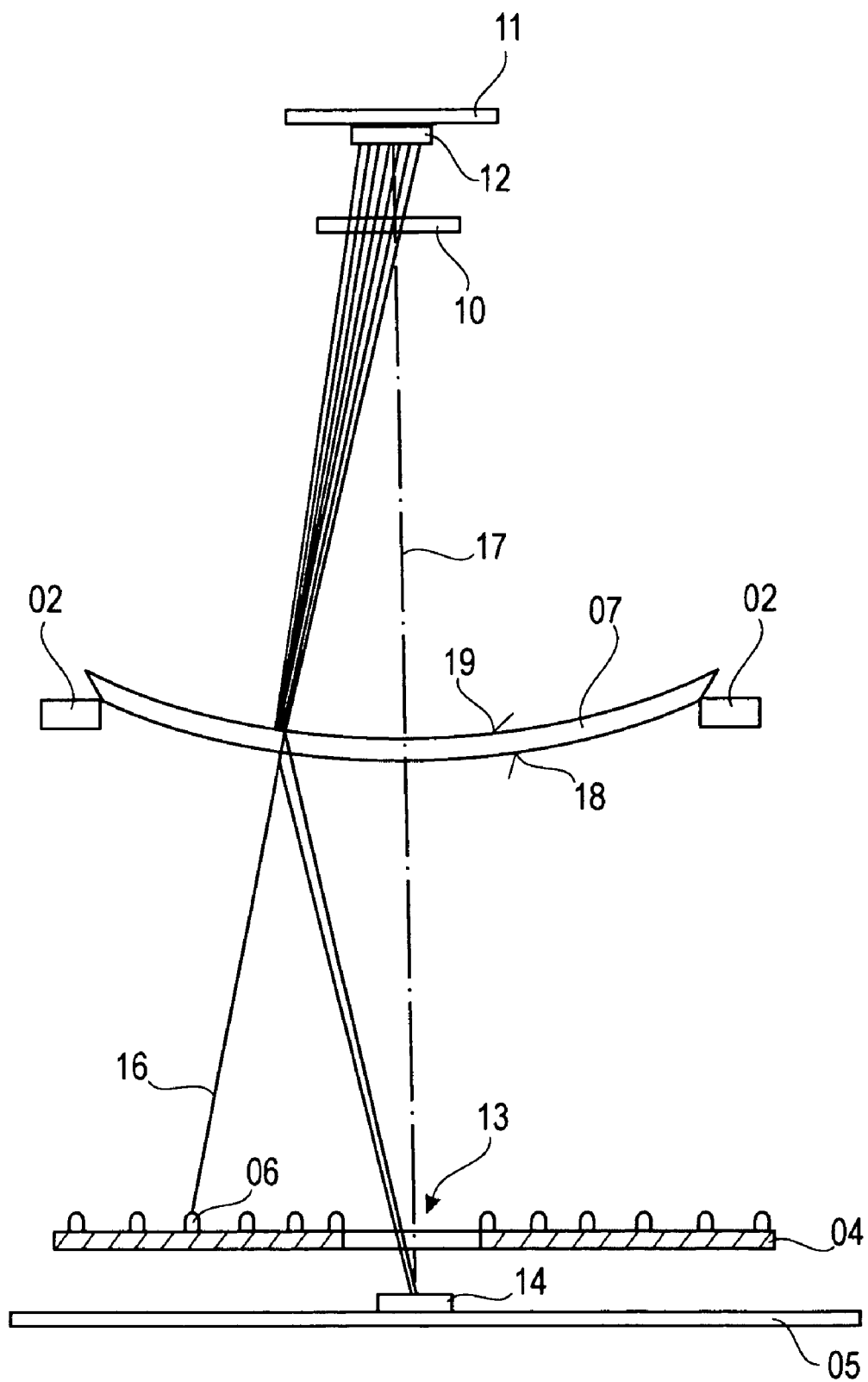
FIG. 3 is a schematic side view of the functional principle of the measuring device according to FIG. 1.

As can be seen from FIG. 3, the light beam 16 of the light-emitting diode 06 passes through the lens 07 at a point which does not lie at the point of passage of the principal optic axis 17 of the measuring device 01. The reflection measuring light detector 14 is used to be able to determine the relative position of the passage point and the geometry of the front lens surface 18 and the rear lens surface 19. The light components of the light beam reflected at the light passage point at the surfaces 18 and 19 are intercepted by the reflection measuring light detector 14 and evaluated accordingly in the evaluation electronics.

The measurement of the transmitted or reflected light using the measuring light detector 12 and the reflection measuring light detector 14 described above is carried out successively by switching on the total of 64 light-emitting diodes 06. A total of 64 light point grids each having 37 light points is then available in the evaluation electronics for determining the refraction properties of the lens 07. At the same time, the geometry of the lens 07 and its position in the measuring device 01 is determined from the measured values of the reflection measuring light detector 14 and these evaluation results of the additional measuring system are taken into account when determining the refraction properties. As a result, the lens 07 no longer needs to be moved to completely determine its varying refraction properties at various locations in the measuring device 01.

Figure 4:
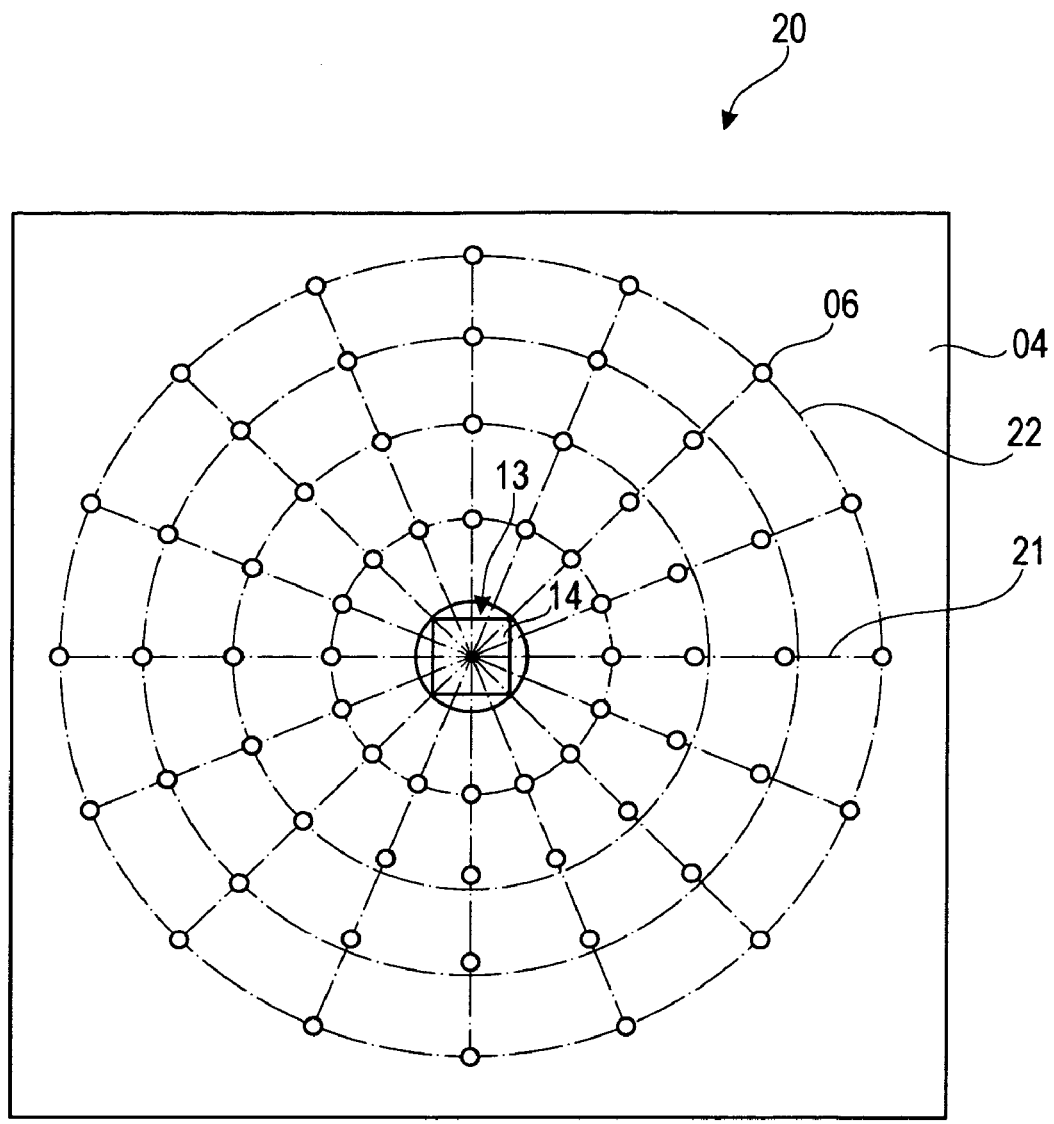
FIG. 4 shows the structure of the measuring light grid of the measuring device according to FIG. 1 viewed from above.

The schematic structure of the measuring light grid 20 whose light-emitting diodes 06 serve as reflection measuring light sources at the same time, can be seen from FIG. 4. The light-emitting diodes 06 are arranged on a polar grid to form the measuring light grid 20, this being obtained from the points of intersection of 16 uniformly distributed grid lines 21 with four concentrically arranged grid circles 22. The recess 13 is provided at the center of the measuring light grid 20, the reflection measuring light detector 14 being located thereunder.

Figure 5:
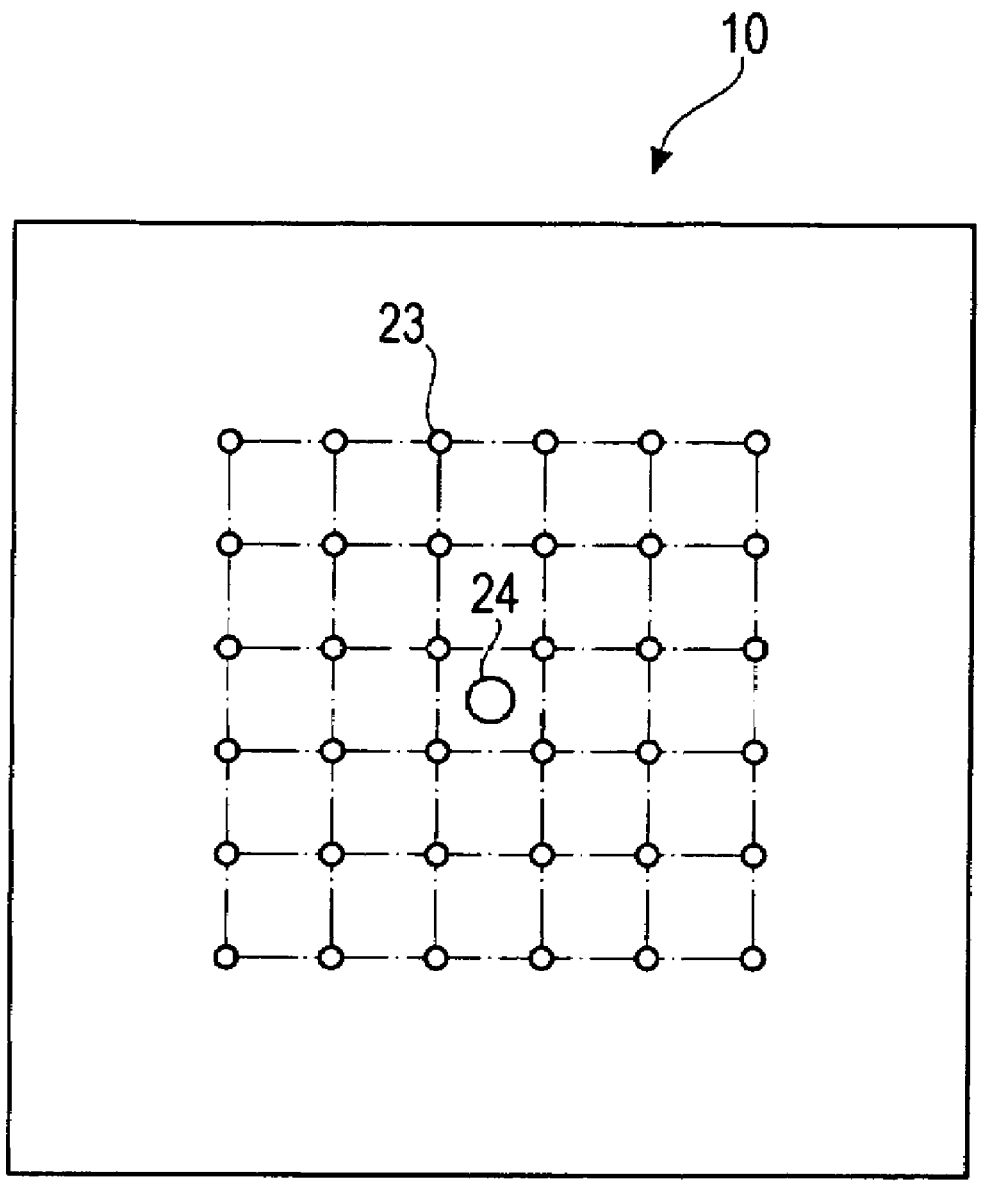
FIG. 5 shows the structure of the screen arranged in front of the measuring light detector of the measuring device from FIG. 1.

FIG. 5 shows the structure of the screen 10 with the light passage openings 23 and 24 viewed from above. The light passage openings 23 have a small circular cross-section and are arranged at the 36 points of intersection of a Cartesian 6×6 grid. Provided at the center of this Cartesian grid is the light passage opening 24 which has a larger cross-section and thus serves as an index marking for projection on the measuring light detector 12. A metal plate is processed with a laser beam to form recesses to produce the light passage openings 23 and 24. Alternatively, a nontransparent printed image layer having recesses at the corresponding points can be applied to a glass plate.

What is claimed is:

1. A measuring device for measuring the refraction properties of optical lenses, comprising;
   a measuring light grid for producing a plurality of light beams which are deflected by a lens as a result of refraction of light;
   a first measuring light detector on which the deflected light beams are projected and are recorded electronically to generate first measurement signals;
   an evaluation device in which refraction properties of the lens are determined based on the first measurement signals of the first measuring light detector; and
   an additional measuring system to determine at least a geometry of a surface of the lens, and to generate second measurement signals wherein the second measurement signals of the additional measuring system are provided to the evaluation device to determine the refraction properties of the lens.

2. The measuring device according to claim 1, wherein a relative position of the lens in the measuring device is measured using the additional measuring system.

3. The measuring device according to claim 1, wherein the additional measuring system comprises one or more reflection measuring light sources and a reflection measuring light detector, wherein the light beams produced by the reflection measuring light source are at least partly reflected at a front lens surface, and wherein the reflected light beams are projected onto the reflection measuring light detector and are there recorded electronically, and wherein the geometry of the front lens surface and/or the rear lens surface and/or the relative position of the lens in the measuring device are determined in the evaluation device from the measurement signals of the reflection measuring light detector.

4. The measuring device according to claim 3, wherein the reflection measuring light detector is arranged in the center of the measuring light grid.

5. The measuring device according to claim 3, wherein the reflection measuring light detector is arranged opposite to the first measuring light detector on a principal optic axis of the measuring device.

6. The measuring device according to claim 3, wherein the reflection measuring light sources are arranged in the measuring light grid in a Cartesian or polar grid.

7. The measuring device according to claim 6, wherein 64 light sources of the reflection measuring light sources are arranged in a polar grid at points of intersections of 16 grid lines and four concentric grid circles.

8. The measuring device according to claim 3, wherein the reflection measuring light detector is constructed in the fashion of a video sensors, especially in the fashion of a CCD chip or CMOS chip.

9. The measuring device according to claim 1, wherein an extent of an antireflection coating of the lens surfaces is determined in the evaluation device from the measurement signals of the reflection measuring light detector.

10. The measuring device according to claim 1, wherein a refractive index n as a material characteristic of the material forming the lens to be studied is determined in the evaluation device from at least the measurement signals of the reflection measuring light detector.

11. The measuring device according to claim 1, wherein at least two light sources (06) of the measuring light grid (20) produce light beams of different light color, wherein the spectral transmittivity as a material characteristic of the material forming the lens to be studied is determined in the evaluation device from the measurement signals of at least the reflection measuring light detector.

12. The measuring device according to claim 1, wherein light sources of the measuring light grid of the measuring device serve as reflection measuring light sources of the additional measuring system.

13. The measuring device according to claim 1, wherein a plurality of substantially point light sources serve at least as reflection measuring light sources.

14. The measuring device according to claim 13, wherein the plurality of substantially point light sources is formed by white-light emitting light-emitting diodes.

15. The measuring device according to claim 1, wherein a screen comprising a plurality of light passage openings is disposed between the lens to the studied and the first measuring light detector wherein the light beam produced by the measuring light grid and deflected at the lens by refraction of light is projected through the various light passage openings of the screen along separate ray paths onto the measuring light detector.

16. The measuring device according to claim 15, wherein the light passage openings in the screen have a circular cross-section.

17. The measuring device according to claim 15, wherein the light passage openings in the screen are arranged in a Cartesian or polar grid.

18. The measuring device according to claim 15, wherein 36 light passage openings are arranged in a Cartesian 6×6 grid.

19. The measuring device according to claim 15, wherein one light passage opening in the screen serves as index marking and has a different cross-section, especially a larger cross-section than all the other light passage openings.

20. The measuring device according to claim 15, wherein the light passage openings are formed by recesses in a non-transparent screen.

21. The measuring device according to claim 15, wherein the light passage openings are formed by recesses in a non-transparent coating, especially a printed image on a transparent screen.

22. The measuring device according to claim 1, wherein a multipoint bearing comprising in particular three bearing points is provided for mounting the lens.

23. The measuring device according to claim 22, wherein the distance between the bearing points of the multipoint bearing is adjustable.

24. The measuring device according to claim 1, wherein the evaluation unit is connected to a display device.

* * * * *